United States Patent
Schmidl et al.

(10) Patent No.: US 8,446,934 B2
(45) Date of Patent: May 21, 2013

(54) FREQUENCY DIVERSITY AND PHASE ROTATION

(75) Inventors: Timothy M. Schmidl, Dallas, TX (US); Anuj Batra, Dallas, TX (US); Srinath Hosur, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 388 days.

(21) Appl. No.: 12/873,114

(22) Filed: Aug. 31, 2010

(65) Prior Publication Data

US 2011/0051845 A1 Mar. 3, 2011

Related U.S. Application Data

(60) Provisional application No. 61/238,464, filed on Aug. 31, 2009, provisional application No. 61/287,592, filed on Dec. 17, 2009.

(51) Int. Cl.
 *H04B 1/38* (2006.01)
(52) U.S. Cl.
 USPC ........... 375/219; 375/220; 375/260; 375/262; 375/267; 375/295
(58) Field of Classification Search
 USPC ................. 375/219–222, 260, 271, 279, 295, 375/298, 308, 316, 322, 350
 See application file for complete search history.

(56) References Cited

U.S. PATENT DOCUMENTS

| 7,756,215 B2* | 7/2010 | Fukuoka et al. | 375/295 |
| 7,853,418 B2* | 12/2010 | Mikkonen | 702/66 |
| 8,345,783 B1* | 1/2013 | Ionescu et al. | 375/260 |
| 2008/0101487 A1 | 5/2008 | Muck et al. | |
| 2009/0004984 A1* | 1/2009 | Chrabieh et al. | 455/205 |
| 2010/0029223 A1* | 2/2010 | Tang et al. | 455/101 |
| 2010/0074357 A1* | 3/2010 | Ko | 375/267 |
| 2010/0118990 A1* | 5/2010 | Lee et al. | 375/260 |

OTHER PUBLICATIONS

Institute of Electrical and Electronics Engineers, Inc., "IEEE Standard for Information technology—Telecommunications and information exchange between systems—Local and metropolitan area networks—Specific requirements," Part 15.4: Wireless Medium Access Control (MAC) and Physical Layer (PHY) Specifications for Low-Rate Wireless Personal Area Networks (WPANs), IEEE Std 802.15.4™, Sep. 8, 2006, New York, NY.

* cited by examiner

*Primary Examiner* — Hirdepal Singh
(74) *Attorney, Agent, or Firm* — John R. Pessetto; W. James Brady; Frederick J. Telecky, Jr.

(57) ABSTRACT

An integrated circuit includes logic configured to encode one or more first data symbols in one or more first sub-carriers as one or more second data symbols in one or more second sub-carriers of a smart-utility-network communication.

4 Claims, 4 Drawing Sheets

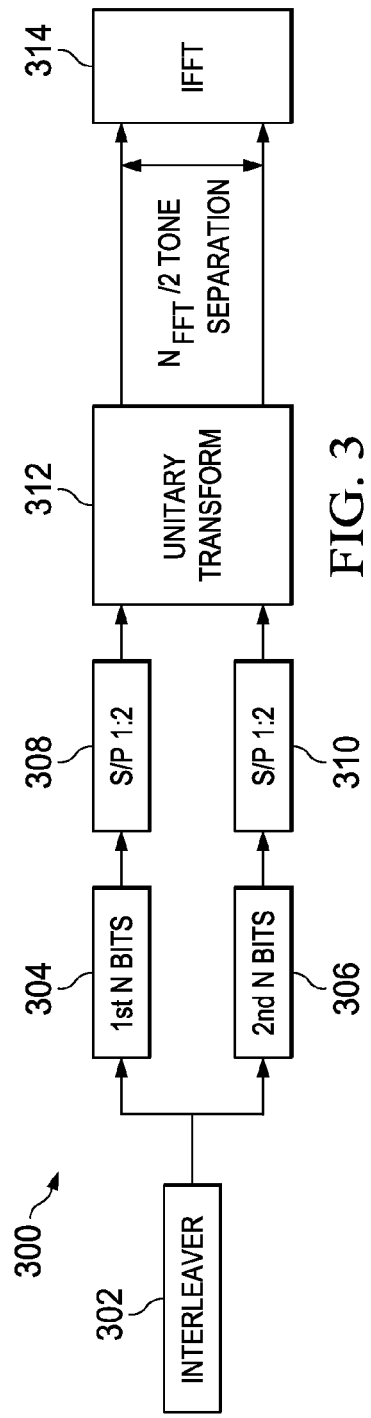

FREQUENCY DIVERSITY AND PHASE ROTATION

CROSS-REFERENCE TO RELATED APPLICATION

The present application claims priority to U.S. Provisional Patent Application No. 61/238,464, filed on Aug. 31, 2009; and U.S. Provisional Patent Application No. 61/287,592, filed on Dec. 17, 2009; all of which are hereby incorporated herein by reference.

BACKGROUND

Wireless personal area networks ("WPANs") are used to convey information over relatively short distances. Unlike wireless local area networks ("WLANs"), connections effected via WPANs involve little or no infrastructure, and WPANS allow small, power-efficient, and inexpensive solutions to be implemented for a wide range of devices. Smart Utility Networks ("SUNs") may operate either over short ranges such as in a mesh network where meter information is sent from one meter to another or over longer ranges such as in a star topology where meter information is sent to a poletop collection point. The terms WPAN and SUN are used interchangeably in this document.

SUMMARY

System and methods for applying frequency diversity and phase rotation to communications such as SUN communications are described herein. In at least some disclosed embodiments, a device includes a processor and a memory coupled to the processor. The processor applies frequency diversity in smart-utility-network communication by encoding one or more first data symbols in one or more first sub-carriers as one or more second data symbols in one or more second sub-carriers.

In other disclosed embodiments, a machine-readable storage medium includes executable instructions that, when executed, cause one or more processors to apply frequency diversity in smart-utility-network communication by encoding one or more first data symbols in one or more first sub-carriers as one or more second data symbols in one or more second sub-carriers.

In other disclosed embodiments, a method includes applying frequency diversity in a smart-utility-network communication by encoding one or more first data symbols in one or more first sub-carriers as one or more second data symbols in one or more second sub-carriers.

These and other features and advantages will be more clearly understood from the following detailed description taken in conjunction with the accompanying drawings and claims.

BRIEF DESCRIPTION OF THE DRAWINGS

For a more complete understanding of the present disclosure, reference is now made to the accompanying drawings and detailed description, wherein like reference numerals represent like parts:

FIG. 3 illustrates a DCM transmitter in accordance with at least some illustrated embodiments;

FIG. 4 illustrates a method of frequency diversity in accordance with at least some illustrated embodiments.

NOTATION AND NOMENCLATURE

Figure 1A:
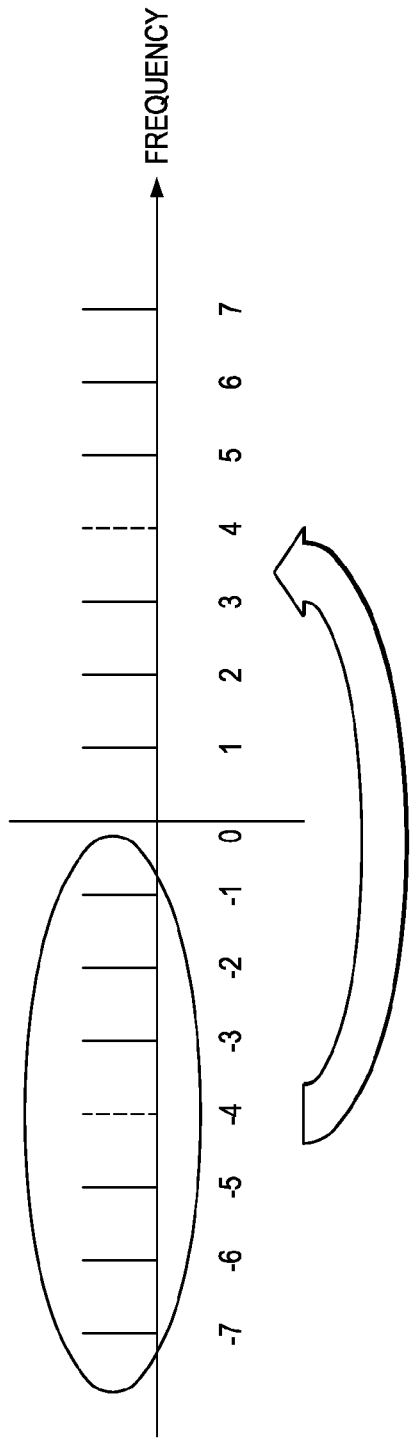
FIGS. 1A-1B illustrates a frequency diversity of 2 in accordance with at least some illustrated embodiments.

Certain terms are used throughout the following claims and description to refer to particular components. As one skilled in the art will appreciate, different entities may refer to a component by different names. This document does not intend to distinguish between components that differ in name but not function. In the following discussion and in the claims, the terms "including" and "comprising" are used in an open-ended fashion, and thus should be interpreted to mean "including, but not limited to . . . ." Also, the term "couple" or "couples" is intended to mean an optical, wireless, indirect electrical, or direct electrical connection. Thus, if a first device couples to a second device, that connection may be through an indirect electrical connection via other devices and connections, through a direct optical connection, etc. Additionally, the term "system" refers to a collection of two or more hardware components, and may be used to refer to an electronic device.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims, unless otherwise specified. In addition, one having ordinary skill in the art will understand that the following description has broad application, and the discussion of any embodiment is meant only to be exemplary of that embodiment, and not intended to intimate that the scope of the disclosure, including the claims, is limited to that embodiment.

This disclosure describes how frequency and time diversity can be implemented in a SUN or WPAN system. However, the disclosure is not limited to SUNs but may be applicable to any wireless communication system. A WPAN or low-rate WPAN is a simple, low-cost communication network that allows wireless connectivity in applications with limited power and relaxed throughput requirements. The main objectives of a WPAN are ease of installation, reliable data transfer, short-range operation, extremely low cost, reasonable battery life, and a simple but flexible protocol.

Some characteristics of a WPAN are:
- Over-the-air data rates of 250 kb/s, 100 kb/s, 40 kb/s, and 20 kb/s
- Star or peer-to-peer or mesh operation
- Allocated 16-bit short or 64-bit extended addresses
- Optional allocation of guaranteed time slots
- Carrier sense multiple access with collision avoidance channel access
- Fully acknowledged protocol for transfer reliability
- Low power consumption
- Energy detection
- Link quality indication
- 16 channels in the 2450 MHz band, 30 channels in the 915 MHz band, and 3 channels in the 868 MHz band.

These characteristics are not requirements, and each WPAN may deviate from the characteristics in numerous ways. Two different device types can participate in a WPAN: a full-function device ("FFD") and a reduced-function device ("RFD"). The FFD can operate in three modes serving as a personal area network ("PAN") coordinator, a coordinator, or a device. A FFD can talk to RFDs or other FFDs while a RFD can talk only to a FFD. More information can be found at IEEE Std. 802.15.4-2006 available at http://www.ieee802.org/15/pub/TG4.html and hereby incorporated by reference.

A utility network or smart utility network ("SUN") is a low-rate (e.g., 40 kbps to 1 Mbps) low-power WPAN that is specifically designed for use in utility metering applications such as transmitting electric, gas, water usage, and other like data from the customer premises to a data collection point operated by the utility. For example, meters are installed for each house in a residential neighborhood, and the usage data is sent periodically such as every 15 minutes from each meter to a data collection point, which is an element of the WPAN. The data collection point is connected by fiber, copper wire, or wireless connection to a central office that collects all the usage data for a region. Usage data is sent either directly from each meter to the collection point or from meter to meter until the collection point is reached in a star or network formation, respectively.

To improve bit error rate and frame error rate in a WPAN, time diversity or frequency diversity can be implemented. For example, the same data symbol such as BPSK or QPSK, or function of the data symbol, can be repeated at various times or over various frequencies. In a SUN system that operates with fixed meters, the Doppler rate is usually low so that the benefits of frequency diversity are usually more significant than for time diversity. The term OFDM symbol refers to the set of orthogonal sub-carriers that are usually transformed into the time domain with an IFFT, and the term data symbol refers to the modulation on each sub-carrier such as BPSK, QPSK, 16-QAM, or m-QAM in general.

FIG. 1A illustrates frequency-domain spreading plus conjugate symmetry. Specifically, how a frequency diversity of 2 can be applied in a SUN system. The x-axis in FIG. 1A represents the sub-carriers to which orthogonal frequency division multiplexing ("OFDM") data symbols are encoded. The long vertical line in the center marks the DC sub-carrier, which is not used in at least one embodiment. Each solid vertical line represents one data sub-carrier in this example. The two dashed vertical lines represent pilot sub-carriers. To the left of the DC sub-carrier, the data sub-carriers are indexed from left to right as −7, −6, −5 and −3, −2, −1. The pilot sub-carrier is indexed as −4. To the right of the DC sub-carrier, the data sub-carriers are indexed from left to right as 1, 2, 3 and 5, 6, 7. The pilot sub-carrier is indexed as 4. To provide a frequency diversity of 2, the complex conjugate of a data symbol at sub-carrier −7 is encoded to sub-carrier 7. Similarly, the complex conjugates of data symbols at sub-carriers −6, −5, −3, −2, and −1 are encoded to sub-carriers 6, 5, 3, 2, and 1, respectively. In at least one embodiment, the pilot sub-carriers are used and behave like data sub-carriers. As such, a real signal can be generated at the transmitter by using a single digital-to-analog converter ("DAC"). Encoding occurs from positive-indexed sub-carriers to negative-indexed subcarriers in at least one embodiment.

Figure 1B:
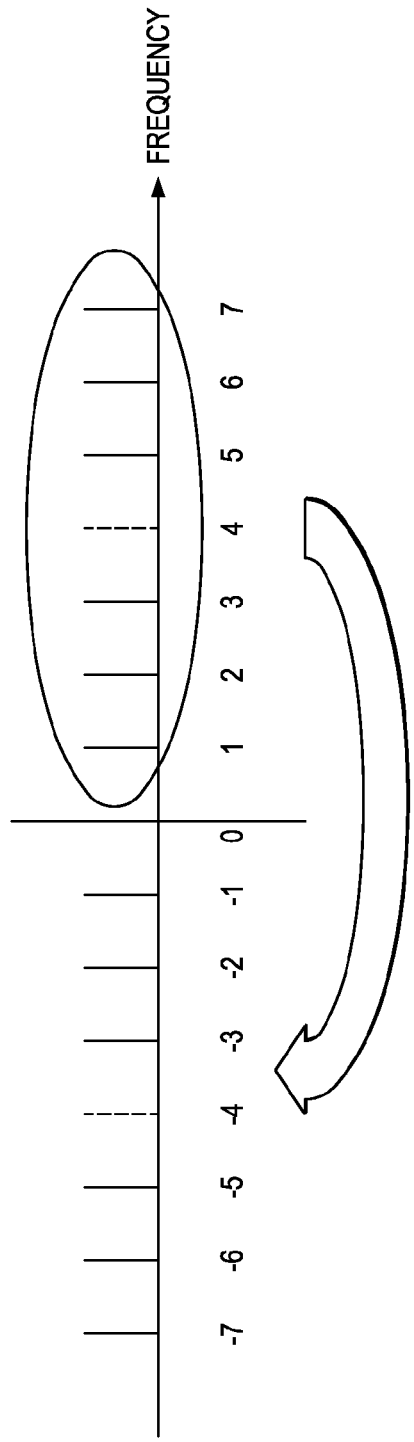

In FIG. 1B, frequency-domain spreading plus phase rotation is implemented. The sub-carrier 4 in this example is represented by a dashed line to indicate a pilot sub-carrier that carries pilot data, which is known at the receiver. Here, the data symbol in sub-carrier 1 is copied to sub-carrier −7. A phase rotation is applied to sub-carrier −7 to allow for a lower peak-to-average power ratio ("PAR") at the output of the IFFT. Similarly, sub-carriers 2, 3, 5, 6, and 7 are encoded, or mapped, to sub-carriers −6, −5, −3, −2, and −1, respectively. As such all the sub-carriers benefit from frequency diversity. In various embodiments, any number of sub-carriers is mapped to any other number of sub-carriers on either side of the DC sub-carrier. As such, for frequency-domain spreading plus phase rotation, there are no requirements for the pilot sub-carriers in at least one embodiment, and a complex output results. However, for frequency-domain spreading plus conjugate symmetry, the pilot sub-carriers should be such that the entire OFDM data symbol is conjugate symmetric and produces a real output in at least one embodiment.

Figure 2A:
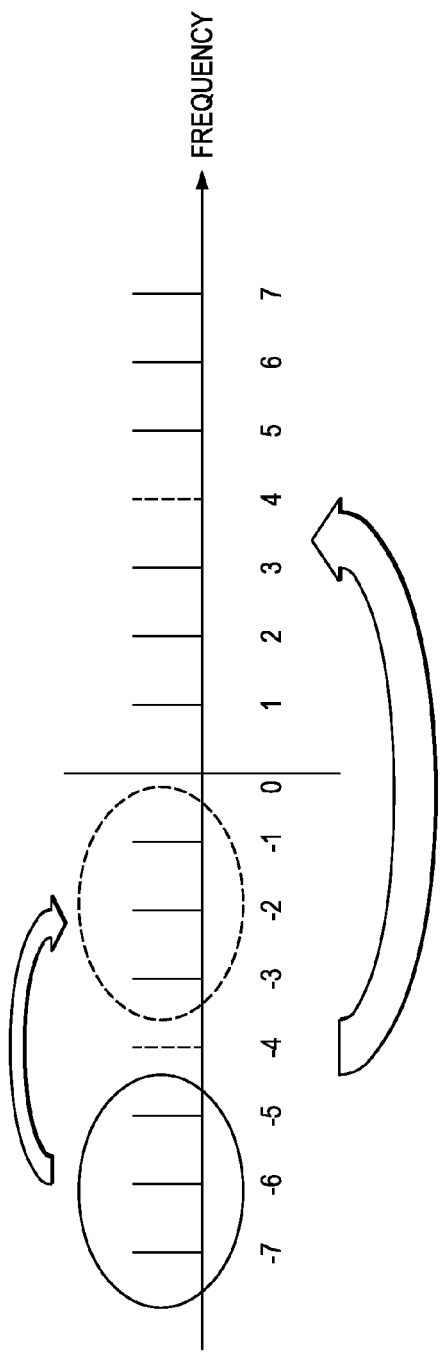
FIGS. 2A-2B illustrates a frequency diversity of 4 in accordance with at least some illustrated embodiments.

FIG. 2 illustrates a method of implementing a frequency diversity of 4. First, the data symbols at sub-carriers −7, −6, and −5 are encoded to −3, −2, and −1, respectively. As such, a frequency diversity of ¼ of the number of sub-carriers used is ensured. Next, the complex conjugates of the data symbols of the negative sub-carriers are encoded to the positive sub-carriers, similar to FIG. 1.

Figure 2B:
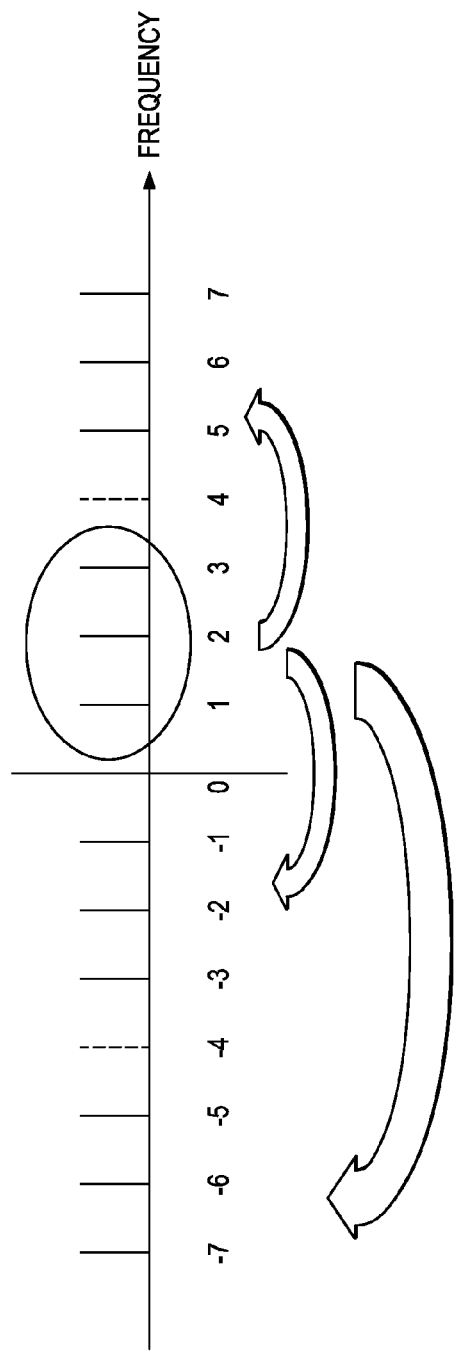

In FIG. 2B, phase rotation is implemented. The data symbol in sub-carrier 1 is encoded to sub-carriers −7, −3, and 5 for frequency diversity. Phase rotations are applied to sub-carriers −7, −3, and 5 for a low PARs at the output of the IFFT. Similarly, sub-carrier 2 is mapped to sub-carriers −6, −2, and 6; and sub-carrier 3 is mapped to sub-carriers −5, −1, and 7. As such, each sub-carrier has a frequency diversity of 4. In at least one embodiment, the phase rotations vary from sub-carrier to sub-carrier to produce a low PAR, and each phase rotation is based on the index of the corresponding sub-carrier.

Table 1 illustrates a set of modulation and coding schemes ("MCS") that may be used for a SUN system. The number of data sub-carriers per OFDM symbol is divisible by 4 in at least one embodiment. As such, it is straightforward to provide frequency diversity by a factor of 4. In various embodiments, frequency diversity by factors other than 4 is implemented.

TABLE 1

Modulation and Coding Schemes for 5 IFFT Sizes

| | Option Number of Data Sub-Carrier (NDSC) | | | | | | | | | | | | | |
|---|---|---|---|---|---|---|---|---|---|---|---|---|---|---|
| | 1 96 | | | 2 48 | | | 3 24 | | | 4 12 | | | 5 4 | | |
| MCS | NCBPS | NDBPS | Rate | NCBPS | NDBPS | Rate | NCBPS | NDBPS | Rate | NCBPS | NDBPS | Rate | NCBPS | NDBPS | Rate |
| 0 | 24 | 12 | 93.75 | | | | | | | | | | | | |
| 1 | 48 | 24 | 187.5 | 24 | 12 | 93.75 | 12 | 6 | 46.88 | | | | | | |
| 2 | 96 | 48 | 375 | 48 | 24 | 187.5 | 24 | 12 | 93.75 | 12 | 6 | 46.88 | | | |
| 3 | 96 | 72 | 562.5 | 48 | 36 | 281.25 | 24 | 18 | 140.63 | 12 | 9 | 70.31 | | | |
| 4 | 192 | 96 | 750 | 96 | 48 | 375 | 48 | 24 | 187.5 | 24 | 12 | 93.75 | | | |
| 5 | 192 | 120 | 937.5 | 96 | 60 | 468.75 | 48 | 30 | 234.38 | 24 | 15 | 117.19 | | | |

TABLE 1-continued

Modulation and Coding Schemes for 5 IFFT Sizes

| | Option | | | | | | | | | | | | | | |
|---|---|---|---|---|---|---|---|---|---|---|---|---|---|---|---|
| | Number of Data Sub-Carrier (NDSC) | | | | | | | | | | | | | | |
| | 1 | | | 2 | | | 3 | | | 4 | | | 5 | | |
| | 96 | | | 48 | | | 24 | | | 12 | | | 4 | | |
| MCS | NCBPS | NDBPS | Rate | NCBPS | NDBPS | Rate | NCBPS | NDBPS | Rate | NCBPS | NDBPS | Rate | NCBPS | NDBPS | Rate |
| 6 | | | | 96 | 72 | 562.5 | 48 | 36 | 281.25 | 24 | 18 | 140.63 | 8 | 6 | 46.88 |
| 7 | | | | 192 | 96 | 750 | 96 | 48 | 375 | 48 | 24 | 187.5 | 16 | 8 | 62.5 |
| 8 | | | | 192 | 120 | 937.5 | 96 | 60 | 468.75 | 48 | 30 | 234.38 | 16 | 10 | 78.13 |
| 9 | | | | | | | 96 | 72 | 562.5 | 48 | 36 | 281.25 | 16 | 12 | 93.75 |

NCBPS = number of coded bits per OFDM symbol,
NDBPS = number of data bits per OFDM symbol The effects of time diversity can be significantly helpful for a high Doppler rate. One way to implement time diversity is repetition, e.g., sending the same OFDM symbol at two different times. Other ways to implement time diversity is via a cyclic shift of the sub-carriers or via applying different interleaving on the repeated OFDM symbols. In at least one embodiment, the MCS levels for Table 1 have the following characteristics:

| MCS | Constellation | Code Rate | Frequency Domain Spreading | Real Output |
|---|---|---|---|---|
| 0 | BPSK | 1/2 | 4 | YES |
| 1 | BPSK | 1/2 | 2 | YES |
| 2 | QPSK | 1/2 | 2 | YES |
| 3 | QPSK | 3/4 | 2 | YES |
| 4 | DCM-QPSK | 1/2 | 1 | NO |
| 5 | DCM-QPSK | 5/8 | 1 | NO |
| 6 | DCM-QPSK | 3/4 | 1 | NO |
| 7 | 16 QAM | 1/2 | 1 | NO |
| 8 | 16 QAM | 5/8 | 1 | NO |
| 9 | 16 QAM | 3/4 | 1 | NO |

FIG. 3 illustrates a dual carrier modulation transmitter ("DCM") 300, and the DCM 300 provides frequency diversity without sacrificing data rate. The interleaver module 302 arranges the bits of the two data symbols together according to various algorithms in various embodiments. The bits are separated in half via separator modules 304 and 306, and each half enters a serial to parallel converter 308, 310. Next, the two halves are jointly encoded by the unitary transform module 312, and the output is separated onto two sub-carriers via the inverse fast Fourier transform module 314. If one of the two sub-carriers is experiencing noise, interference, or frequency-selective fading, the both data symbols may be recovered using the other sub-carrier. A joint maximum a posteriori ("MAP") decoder (or a lower-complexity MAP decoder that exploits max-star or max-log approximations) can be used at the receiver (not shown).

In at least one embodiment, frequency or time diversity is used for lower data rates and DCM is used for intermediate data rates that use QPSK. The unitary matrix for this case is given by:

$$T = \frac{1}{\sqrt{5}}\begin{bmatrix} \pm 2 & \pm 1 \\ \pm 1 & \mp 2 \end{bmatrix} \text{ or } T = \frac{1}{\sqrt{5}}\begin{bmatrix} \pm 1 & \pm 2 \\ \pm 2 & \mp 1 \end{bmatrix}$$

where the + and − are chosen to ensure that T is a unitary matrix, i.e., TT*=I, where ( )* represents a matrix transpose and I is the identity matrix.

Orthogonal frequency division multiplexing ("OFDM") is a modulation technique that can be used for the physical layer of the SUN. Table 2 illustrates some OFDM options. Option 1 may be generated using a 128 point inverse fast Fourier transform ("IFFT"), Option 2 may be generated using a 64 point IFFT, and Options 3, 4, and 5 may be generated using 32, 16, and 8 point IFFTs, respectively. For oversampling, various sizes of IFFTs, such as 256 point, may be used in various embodiments.

TABLE 2

| OFDM Options | | | | | | |
|---|---|---|---|---|---|---|
| | Option 1 | Option 2 | Option 3 | Option 4 | Option 5 | Unit |
| Sampling Rate | 1333333.33 | 666666.666 | 333333.333 | 166666.666 | 83333.3333 | Samp/sec |
| FFT size | 128 | 64 | 32 | 16 | 8 | |
| Tone Spacing | 10416.66667 | 10416.66667 | 10416.66667 | 10416.66667 | 10416.66667 | Hz |
| FFT Duration | 96 | 96 | 96 | 96 | 96 | microsec |
| Guard Interval | 24 | 24 | 24 | 24 | 24 | microsec |
| Symbol Duration | 120 | 120 | 120 | 120 | 120 | microsec |
| Symbol Rate | 8.33333333 | 8.33333333 | 8.33333333 | 3.33333333 | 8.33333333 | k Sym/sec |
| Pilot-based Modulation | | | | | | |
| Active Tones | 104 | 52 | 26 | 14 | 7 | |
| # Pilots tones | 8 | 4 | 2 | 2 | 1 | |
| # Data Tones | 96 | 48 | 24 | 12 | 6 | |
| # DC null tones | 1 | 1 | 1 | 1 | 1 | |

TABLE 2-continued

OFDM Options

|  | Option 1 | Option 2 | Option 3 | Option 4 | Option 5 | Unit |
|---|---|---|---|---|---|---|
| Approximate Signal BW | 1.09E+06 | 5.52E+05 | 2.81E+05 | 1.56E+05 | 8.33E+04 | Hz |
| BPSK 1/2 rate coded and 4x repetition | 100.00 | 50.00 | 25.00 | 12.50 | 6.25 | kbps |
| BPSK 1/2 rate coded and 2x repetition | 200.00 | 100.00 | 50.00 | 25.00 | 12.50 | kbps |
| BPSK 1/2 rate coded | 400.00 | 200.00 | 100.00 | 50.00 | 25.00 | kbps |
| BPSK 3/4 rate coded | 600.00 | 300.00 | 150.00 | 75.00 | 37.50 | kbps |
| QPSK 1/2 rate coded | 800.00 | 400.00 | 200.00 | 100.00 | 50.00 | kbps |
| QPSK 3/4 rate coded | 1200.00 | 600.00 | 300.00 | 150.00 | 75.00 | kbps |
| 16-QAM 1/2 rate coded | 1600.00 | 800.00 | 400.00 | 200.00 | 100.00 | kbps |
| 16-QAM 3/4 rate coded | 2400.00 | 1200.00 | 600.00 | 300.00 | 150.00 | kbps |
| Raw rate (BPSK, no coding, no repetition) | 800.00 | 400.00 | 200.00 | 100.00 | 50.00 | kbps |
| Suggested Channel Spacing | 1200 | 600 | 400 | 200 | 100 | kHz |

Two advantages to using complex signals are good frequency diversity when frequency spreading is used (duplicate tones have large frequency separation) and lower peak-to-average power ratio (PAR) at the output of the IFFT. In at least one embodiment, complex signals are used for all MCS levels. For example, using option 1 for real signals (using binary phase shift keying ("BPSK") with a spreading factor of 2) results in a PAR of 9.1 dB and production of real signals for generic data, whereas using option 1 for complex signals results in a PAR of 7.2 dB and production of complex signals for generic data.

In at least one embodiment, data symbols are encoded on 24 data sub-carriers, and each data sub-carrier is copied to 3 other sub-carriers. However, simply encoding the data on sub-carriers without phase rotation increases the peak-to-average ratio versus having independent data on all 96 tones. As such, the 3 copies are phase-rotated so that the PAR does not increase at the output of the IFFT. For example, for the first set of copied data sub-carriers, the extra phase from sub-carrier to sub-carrier is 90 degrees. For the second set, the extra phase is 180 degrees. For the third set, the extra phase is 270 degrees.

In at least one embodiment, the sub-carriers are indexed from −52 to 52 including both data sub-carriers and the pilot sub-carriers. For example, these can be denoted $d_{-52}$ to $d_{52}$. Sub-carrier 1 is encoded to sub-carriers 27, −52, and −26 (with phase rotations of 90, 180, and 270 degrees, respectively) so that maximum frequency spacing is maintained between copies. The data of $d_{27}$ to $d_{52}$ are rotated by [1, j, −1, 1, j, −1, −j, . . . ], the data of $d_{-52}$ to $d_{-27}$ are rotated by [j, −j, j, −j, j, −j, j, −j, . . . ], and the data of $d_{-26}$ to $d_{-1}$ are rotated by [−1, j, 1, −1, j, 1, . . . ]. For example, $d_1$ is encoded to $d_{27}$ after being scaled by 1, $d_2$ is encoded to $d_{28}$ after being scaled by j, $d_3$ is encoded to $d_{29}$ after being scaled by −1, $d_4$ is encoded to $d_{30}$ after being scaled by $d_5$ is encoded to $d_{31}$ after being scaled by 1, etc. In other words the vector ($d_1$, $d_2$, $d_3$, $d_{26}$) is encoded to ($d_{27}$, $d_{28}$, $d_{29}$, $d_{52}$), and then a linear phase is applied to obtain (1*$d_{27}$, j*$d_{28}$, −1*$d_{29}$, . . . , j*$d_{52}$).

In equation form, $d_k$ is multiplied by exp(j*[pi*m(k)+pi/2]) for k=−52 to −1 where m(k) is the sub-carrier number as an absolute index, i.e., m(k)=0 to 51 for k=−52 to −1. The same phase rotations can be used for all 5 options.

Table 3 illustrates various PARs for the various options using generic data.

TABLE 3

PARs for all Options with Phase Rotations

|  | Option 1 | Option 2 | Option 3 | Option 4 | Option 5 |
|---|---|---|---|---|---|
| SF = 1 | 7.3 dB | 6.8 dB | 6.7 dB | 6.6 dB | 6.5 dB |
| SF = 2 | 7.2 dB | 6.6 dB | 6.7 dB | 6.6 dB | 6.5 dB |
| SF = 4 | 7.2 dB | 6.5 dB | 6.7 dB | 6.6 dB | 6.5 dB |

Phase Rotations in Matlab Format are shown below. In general, if there are N sub-carriers, the Matlab sub-carrier numbering is 0, 1, 2, 3, . . . , (N/2)−1 followed by −(N/2), . . . , −3, −2, −1. The % symbol denotes an explanatory comment.
% frequency spreading of 2 for Option 1
Itfr1=zeros (1,128);
Itfr1 (2:53)=2*(rand(1,52)>0.5)−1; % original data sub-carriers
Itfr1(77:128)=exp(j*2*µl*(1:2:103)/4).*(Itfr1(2:53));   % copied data sub-carriers with phase rotations
% frequency spreading of 4 for Option 1
  Itfr1=zeros(1,128);
  Itfr1(2:27)=2*(rand(1,26)>0.5)−1; % original data sub-carriers
  Itfr1(28:53)=exp(j*2*pi*(0:25)/4).*(Itfr1(2:27)); % copied data sub-carriers with phase rotations
  Itfr1(77:102)=exp(j*2*pi*(1:2:51)/4).*(Itfr1(2:27));   % copied data sub-carriers with phase rotations
  Itfr1(103:128)=exp(j*2*pi*(2:3:77)/4).*(Itfr1(2:27));   % copied data sub-carriers with phase rotations In an alternative embodiment, the phase rotation can be generated by a different algorithm. For example, the phase rotation could be derived from the indexes of the first group of sub-carriers, the indexes of the second group of sub-carriers, or both. For example, consider a set of phase rotation mappings $f_1$, $f_2$, and $f_3$, where the mappings vary with the index number of each sub-carrier.

$$d_1, d_2, \ldots, d_{26} \rightarrow d_{27}, d_{28}, \ldots, d_{52}$$
$$f_1$$
$$d_1, d_2, \ldots, d_{26} \rightarrow d_{-52}, d_{-52}, \ldots, d_{-27}$$
$$f_2$$
$$d_1, d_2, \ldots, d_{26} \rightarrow d_{-26}, d_{-25}, \ldots, d_{-1}$$
$$f_3$$

Additionally, $f_1$, $f_2$, and $f_3$ are both phase rotations and amplitude shifts in at least one embodiment.

FIG. 4 illustrates a method of applying frequency diversity beginning at 402 and ending at 408. While at least one embodiment is illustrated, the method 400 can comprise any step described above in various embodiments. At 404, one or more first data symbols in one or more first sub-carriers are encoded as one or more second data symbols in one or more second sub-carriers in a smart-utility-network communication. At 406, the one or more second data symbols are phase-rotated. In at least one embodiment, the phase rotation is by $[1, j, -1, -j, 1, j, -1, -j \ldots]$, $[j, -j, j, -j, j, -j, j, -j \ldots]$, or $[-1, j, 1, -j, -1, j, 1, -j \ldots]$ compared to the one or more first data symbols. In another embodiment, the one or more second data symbols are complex conjugates of the one or more first data symbols. The phase rotation is based on indexes of the one or more first sub-carriers in at least one embodiment. For example, the phase rotation is a function of the index of a first sub-carrier and the index of the sub-carrier to which the data is being encoded. As such, the frequency spread data appears random and has a low PAR at the output of the IFFT.

Figure 5:
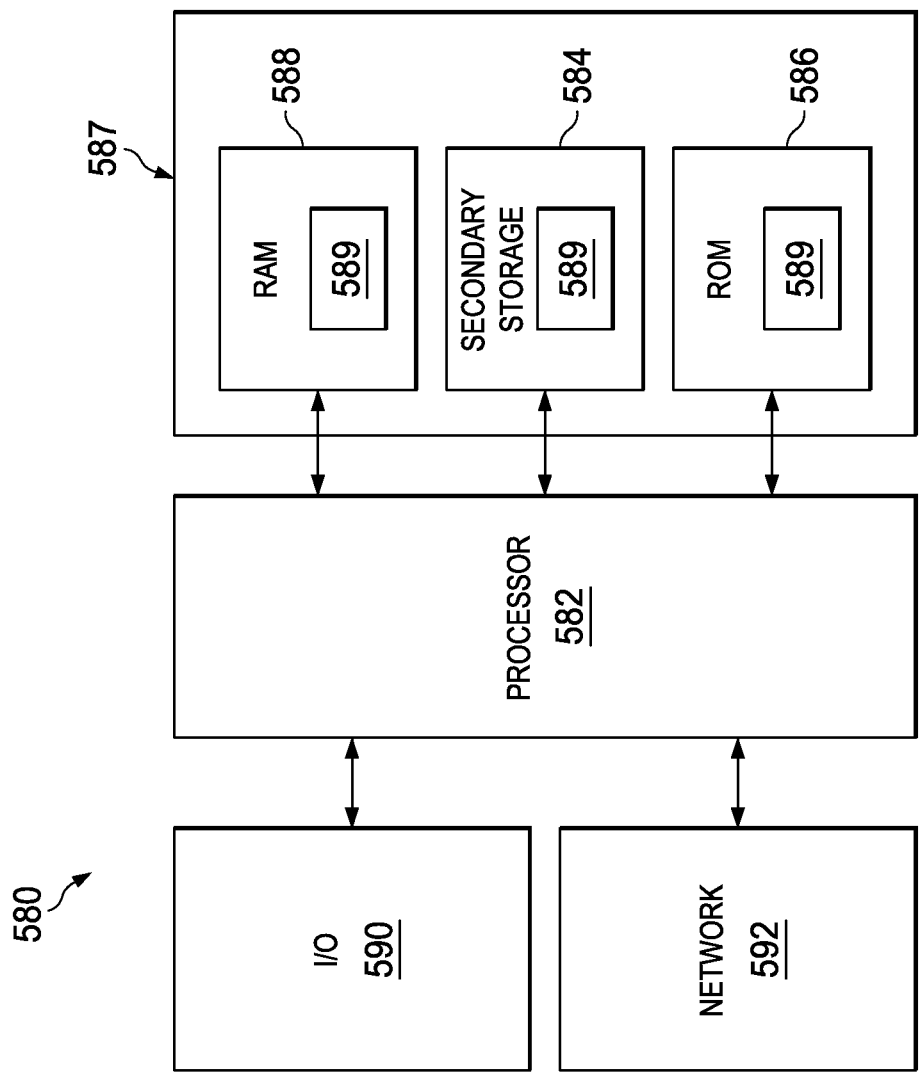
FIG. 5 illustrates a particular machine suitable for implementing one or more embodiments described herein.

The system described above may be implemented on a particular machine with sufficient processing power, memory resources, and network throughput capability to handle the necessary workload placed upon it. FIG. 5 illustrates a particular machine 580 suitable for implementing one or more embodiments disclosed herein. The computer system 580 includes one or more processors 582 (which may be referred to as a central processor unit or CPU) that are in communication with a machine-readable medium 587. The machine-readable medium 587 may comprise memory devices including secondary storage 584, read only memory (ROM) 586, and random access memory (RAM) 588. The processor is further in communication with input/output (I/O) 590 devices and network connectivity devices 592. The processor may be implemented as one or more CPU chips.

The secondary storage 584 is typically comprised of one or more disk drives, tape drives, or optical discs and is used for non-volatile storage of data and as an over-flow data storage device if RAM 588 is not large enough to hold all working data. Secondary storage 584 may be used to store programs and instructions 589 that are loaded into RAM 588 when such programs are selected for execution. The ROM 586 is used to store instructions 589 and perhaps data, which are read during program execution. ROM 586 is a non-volatile memory device that typically has a small memory capacity relative to the larger memory capacity of secondary storage. The RAM 588 is used to store volatile data and perhaps to store instructions 589. Access to both ROM 586 and RAM 588 is typically faster than to secondary storage 584.

I/O 590 devices may include printers, video monitors, liquid crystal displays (LCDs), touch screen displays, keyboards, keypads, switches, dials, mice, track balls, voice recognizers, card readers, paper tape readers, or other well-known input devices. The network connectivity devices 592 may take the form of modems, modem banks, ethernet cards, universal serial bus (USB) interface cards, serial interfaces, token ring cards, fiber distributed data interface (FDDI) cards, wireless local area network (WLAN) cards, radio transceiver cards such as code division multiple access (CDMA) and/or global system for mobile communications (GSM) radio transceiver cards, and other well-known network devices. These network connectivity 592 devices may enable the processor 582 to communicate with an Internet or one or more intranets. With such a network connection, the processor 582 may receive information from the network, or may output information to the network in the course of performing the above-described method steps. Such information, which is often represented as a sequence of instructions 589 to be executed using processor 582, may be received from and output to the network, for example, in the form of a computer data signal embodied in a carrier wave Such information, which may include data or instructions 589 to be executed using processor 582 for example, may be received from and output to the network, for example, in the form of a computer data baseband signal or signal embodied in a carrier wave. The baseband signal or signal embodied in the carrier wave generated by the network connectivity 592 devices may propagate in or on the surface of electrical conductors, in coaxial cables, in waveguides, in optical media, for example optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, referred to herein as the transmission medium, may be generated according to several methods well known to one skilled in the art.

The processor 582 executes instructions 589, codes, computer programs, scripts which it accesses from hard disk, floppy disk, optical disc (these various disk based systems may all be considered secondary storage 584), ROM 586, RAM 588, or the network connectivity devices 592.

In an alternative embodiment, the system may be implemented in an application specific integrated circuit ("ASIC") comprising logic configured to perform any action described in this disclosure with corresponding and appropriate inputs and outputs or a digital signal processor ("DSP") similarly configured. Such logic is implemented in a transmitter, receiver, or transceiver in various embodiments.

The above disclosure is meant to be illustrative of the principles and various embodiment of the present invention. Numerous variations and modifications will become apparent to those skilled in the art once the above disclosure is fully appreciated. Additionally, audio or visual alerts may be triggered upon successful completion of any action described herein, upon unsuccessful actions described herein, and upon errors. Also, the order of actions can be varied from order described, and two or more actions may be performed concurrently.

Many modifications and other embodiments of the invention will come to mind to one skilled in the art to which this invention pertains having the benefit of the teachings presented in the foregoing descriptions, and the associated drawings. It is intended that the following claims be interpreted to embrace all variations and modifications. Therefore, it is to be understood that the invention is not to be limited to the specific embodiments disclosed. Although specific terms are employed herein, they are used in a generic and descriptive sense only and not for purposes of limitation.

What is claimed is:

1. An integrated circuit, comprising:
logic configured to encode one or more first data symbols in one or more first sub-carriers as one or more second data symbols in one or more second sub-carriers of a smart-utility-network communication;
logic configured to generate the one or more second symbols by applying a phase rotation of a first number of degrees compared to the one or more first data symbols within an OFDM symbol;
logic configured to encode the one or more first data symbols in the one or more first sub-carriers as one or more third data symbols in one or more third sub-carriers;
logic configured to generate the one or more third symbols by applying a phase rotation of a second number of degrees compared to the one or more first data symbols within an OFDM symbol, the second number not equal to the first number.

2. The integrated circuit of claim 1,
comprising logic configured to encode the one or more first data symbols in the one or more first sub-carriers as one or more fourth data symbols in one or more fourth sub-carriers;
comprising logic configured to generate the one or more fourth symbols by applying a phase rotations of a third number of degrees compared to the one or more first data symbols within the OFDM symbol, none of the first number, second number, or third number being equal.

3. An integrated circuit, comprising:
logic configured to encode one or more first data symbols in one or more first sub-carriers as one or more second data symbols in one or more second sub-carriers of a smart-utility-network communication;
logic configured to phase-rotate the one or more second data symbols compared to the one or more first data symbols;
wherein the phase rotation is a rotation by $[1, j, -1, -j, 1, j, -1, -j \ldots]$, $[j, -j, j, -j, j, -j, j, -j \ldots]$ or $[-1, j, 1, -j, -1, j, 1, -j \ldots]$.

4. A method, comprising:
encoding one or more first data symbols in one or more first sub-carriers as one or more second data symbols in one or more second sub-carriers in a smart-utility-network communication;
phase-rotating the one or more second data symbols compared to the one or more first data symbols within an OFDM symbol;
wherein the phase rotation is a rotation by $[1, j, -1, -j, 1, j, -1, -j \ldots]$, $[j, -j, j, -j, j, -j, j, -j \ldots]$, or $[-1, j, 1, -j, -1, j, 1, -j \ldots]$.

* * * * *